US012726916B2

(12) United States Patent
Xing

(10) Patent No.: US 12,726,916 B2
(45) Date of Patent: Sep. 1, 2026

(54) TRANSMIT POWER CONTROL METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jinqiang Xing, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 262 days.

(21) Appl. No.: 18/385,076

(22) Filed: Oct. 30, 2023

(65) Prior Publication Data

US 2024/0064658 A1 Feb. 22, 2024

Related U.S. Application Data

(63) Continuation of application No. PCT/CN2021/091777, filed on Apr. 30, 2021.

(51) Int. Cl.
*H04W 52/36* (2009.01)
*H04W 52/38* (2009.01)

(52) U.S. Cl.
CPC .................................. *H04W 52/38* (2013.01)

(58) Field of Classification Search
CPC .................................................... H04W 52/38
See application file for complete search history.

(56) References Cited

U.S. PATENT DOCUMENTS 8,565,205 B2 * 10/2013 Ho ...................... H04W 52/365 370/252
8,781,437 B2 * 7/2014 Ngai .................. H04W 52/228 455/574
8,886,247 B1 * 11/2014 Price .................... H04B 1/3838 455/575.4
9,408,103 B2 * 8/2016 Bai ....................... H04W 72/21
9,467,919 B2 * 10/2016 Yerrabommanahalli .................... H04W 36/305
10,812,125 B1 * 10/2020 Badic ................ H04W 72/0446
11,324,014 B2 * 5/2022 Sampath .............. H04B 1/3838
11,368,926 B2 * 6/2022 Sampath ............. H04W 52/367
11,408,973 B2 * 8/2022 Stauffer ................ H04W 16/14
(Continued)

FOREIGN PATENT DOCUMENTS

CN 107172592 A 9/2017
CN 111480301 A 7/2020
(Continued)

OTHER PUBLICATIONS

International Search Report issued in International application No. PCT/CN2021/091777, mailed Nov. 26, 2021.
(Continued)

*Primary Examiner* — Hai V Nguyen
(74) *Attorney, Agent, or Firm* — BAYES PLLC

(57) ABSTRACT

A transmit power control method includes: a terminal device sends first information to a network device, the first information being used for instructing the network device to configure a detection time window for the terminal device; the terminal device performs object detection within the detection time window configured by the network device; and the terminal device implements transmit power control on the basis of the result of the object detection.

19 Claims, 8 Drawing Sheets

(56) References Cited

U.S. PATENT DOCUMENTS 11,502,551 B2* 11/2022 Leabman ................ H02J 50/20
11,533,114 B2* 12/2022 Rimini ................. H04B 1/3827
11,660,071 B2* 5/2023 Yang .................... A61B 8/4494 600/466
11,689,235 B2* 6/2023 Zhou .................... H04B 1/3838 370/329
11,757,483 B2* 9/2023 Zhou .................... H04B 1/3838 370/252
11,848,714 B2* 12/2023 Rimini ................. H04B 17/102
12,003,266 B2* 6/2024 Zhou .................... H04B 1/3838
12,075,367 B2* 8/2024 Caporal Del Barrio ..................... H04W 52/146
12,078,748 B2* 9/2024 Ertan ...................... G01S 7/023
12,119,888 B2* 10/2024 Xing ........................ H04B 1/04
12,166,363 B2* 12/2024 Leabman ................ H02J 50/20
12,362,778 B2* 7/2025 Zhang .................... G06V 40/10
2014/0051449 A1* 2/2014 Yerrabommanahalli .................... H04W 36/305 455/437
2014/0302865 A1* 10/2014 Bai ....................... H04W 24/10 455/452.1
2017/0290011 A1 10/2017 Kushnir et al.
2019/0076119 A1* 3/2019 Yang ........................ A61B 1/07
2019/0200365 A1* 6/2019 Sampath .............. H04B 1/3838
2019/0222326 A1* 7/2019 Dunworth .............. H04B 17/13
2020/0107249 A1* 4/2020 Stauffer ................ H04W 48/14
2022/0045554 A1* 2/2022 Leabman ................ H02J 50/20
2023/0090516 A1* 3/2023 Zhang ..................... G01S 13/56 370/328
2023/0198637 A1* 6/2023 Xing ........................ H04B 1/04 375/262
2023/0208198 A1* 6/2023 Leabman ................ H02J 50/20 307/104
2024/0404296 A1* 12/2024 Sah ........................ G06V 20/58
2025/0264580 A1* 8/2025 Ren ....................... G01S 13/003

FOREIGN PATENT DOCUMENTS

CN 111656709 A 9/2020
CN 112005462 A 11/2020

OTHER PUBLICATIONS

Written Opinion of the International Searching Authority issued in International application No. PCT/CN2021/091777, mailed Nov. 26, 2021.

3GPP TS 38.101-2 V16.5.0 (Sep. 2020); Technical Specification Group Radio Access Network; NR; User Equipment (UE) radio transmission and reception; Part 2: Range 2 Standalone (Release 16).

First Office action issued in corresponding Chinese Application No. 202180096836.4, dated May 29, 2026, 18 pages.

* cited by examiner

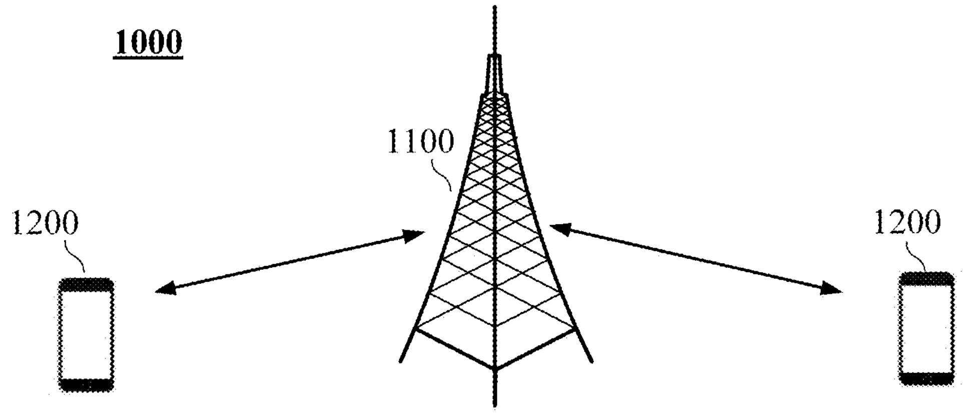
FIG. 1
Low-frequency Input F1
High-frequency Output F2
Modulation Carrier F0
FIG. 2
F1
F0
F2
Frequency
FIG. 3
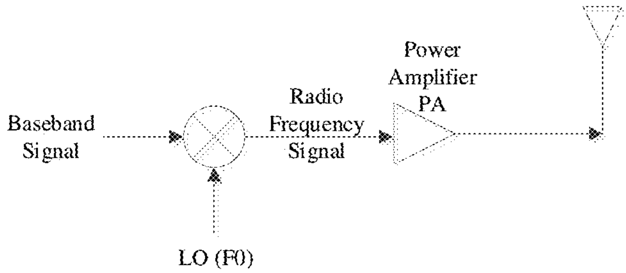
FIG. 4
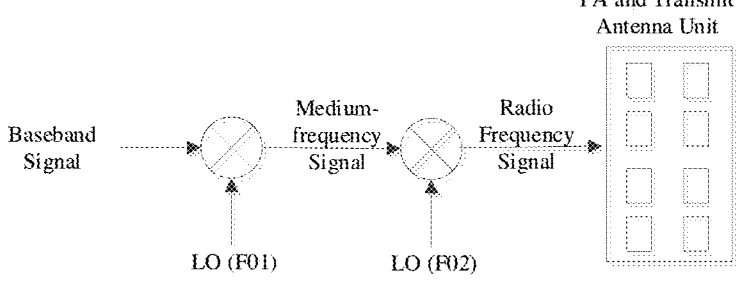
FIG. 5

TRANSMIT POWER CONTROL METHOD, TERMINAL DEVICE, AND NETWORK DEVICE

CROSS-REFERENCE TO RELATED APPLICATION

This application is a continuation of International Application No. PCT/CN2021/091777, filed Apr. 30, 2021, which is herein incorporated by reference in its entirety.

TECHNICAL FIELD

This application relates to the field of communications, and in particular, to a transmit power control method, a terminal device and a network device.

BACKGROUND

Terminal device needs to transmit wireless signals during the communication process, but long-term exposure to the wireless signals may affect human safety. At present, in order to avoid the influence of radiation, some terminal devices may detect surrounding objects, such as human bodies, by means of onboard sensors, and control the transmit power based thereon. However, since installation of the sensors may take up a certain space, it will bring a great challenge to the space of the terminal device, such as a mobile phone, which is originally very limited. When using multiple sensors, costs on both space and hardware are non-negligible factors. In addition, there are some solutions that do not rely on sensors, but adopt a relatively conservative processing manner. However, it is difficult for such terminals to perform optimally on the whole, and there is a large room for improvement.

SUMMARY

In view of above, embodiments of this application provide a transmit power control method, a terminal device, and a network device, which may be used to improve a power control strategy of the terminal device.

Some embodiments of this application provide a transmit power control method, which is applied to a terminal device, including:

- sending, by the terminal device, first information to a network device, where the first information is used for indicating the network device to configure a detection time window for the terminal device;
- performing, by the terminal device, object detection within the detection time window configured by the network device; and
- performing, by the terminal device, transmit power control according to an object detection result Some embodiments of this application provide a transmit power control method, which is applied to a terminal device, including:

- transmitting, by the terminal device, a communication beam on a licensed frequency band;
- transmitting, by the terminal device, a detection beam on an unlicensed frequency band to perform object detection; and
- performing, by the terminal device, transmit power control on the communication beam according to an object detection result.

Some embodiments of this application provide a transmit power control method, which is applied to a network device, including:

- receiving, by the network device, first information sent by a terminal device; and
- configuring, by the network device, a detection time window for the terminal device according to the first information.

Some embodiments of this application further provide a terminal device, including:

- a sending module, configured to send first information to a network device, where the first information is used for indicating the network device to configure a detection time window for the terminal device;
- a detection module, configured to perform object detection within the detection time window configured by the network device; and
- a power control module, configured to perform transmit power control according to an object detection result.

Some embodiments of this application further provide a terminal device, including:

- a transmission module, configured to transmit a communication beam on a licensed frequency band;
- a detection module, configured to transmit a detection beam on an unlicensed frequency band to perform object detection; and
- a power control module, configured to perform transmit power control on the communication beam according to an object detection result.

Some embodiments of this application further provide a network device, including:

- a receiving module, configured to receive first information sent by a terminal device; and
- a configuring module, configured to configure a detection time window for the terminal device according to the first information.

Some embodiments of this application further provide a terminal device, including: a processor and a memory, where the memory is configured to store a computer program, and the processor invokes and executes the computer program stored in the memory to implement the above method.

Some embodiments of this application further provide a network device, including: a processor and a memory, where the memory is configured to store a computer program, and the processor invokes and executes the computer program stored in the memory to implement the above method.

Some embodiments of this application further provide a chip, including: a processor, configured to call and run a computer program from a memory, thereby causing a device installed the chip to implement the above method.

Some embodiments of this application further provide a computer-readable storage medium for storing a computer program, where the computer program causes a computer to implement the above method.

Some embodiments of this application further provide a computer program product, including computer program instructions, where the computer program instructions cause a computer to implement the above method.

Some embodiments of this application further provide a computer program, where the computer program causes a computer to implement the above method.

According to some embodiments of this application, objects such as human bodies can be detected without increasing hardware cost and space occupation, so as to control the transmit power of the terminal, which can effectively improve the power control mechanism of the communication system.

BRIEF DESCRIPTION OF THE DRAWINGS

FIG. 1 is a schematic diagram of a communication system architecture according to some embodiments of this application.

FIG. 2 is a schematic diagram of a signal modulation.

FIG. 3 is a schematic diagram of a signal modulation spectrum.

FIG. 4 is a schematic diagram of signal modulation of a terminal device.

FIG. 5 is a schematic diagram of secondary frequency conversion of a terminal device.

DETAILED DESCRIPTION

Figure 6:
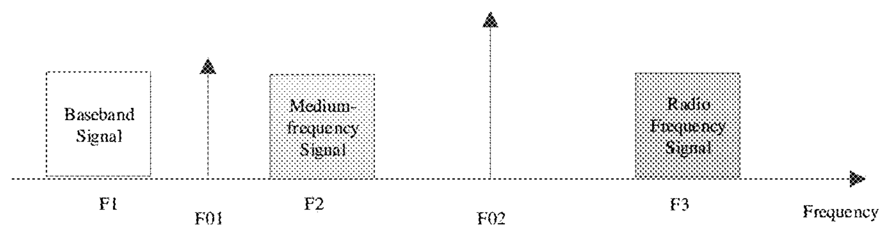
FIG. 6 is a schematic diagram of a secondary frequency conversion frequency relationship of a terminal device.

The technical solutions in some embodiments of this application will be described below with reference to the accompanying drawings in some embodiments of this application.

The technical solutions of some embodiments of this application can be applied to various communication systems, for example, a Global System of Mobile communication (GSM) system, a Code Division Multiple Access (CDMA) system, a Wideband Code Division Multiple Access (WCDMA) system, General Packet Radio Service (GPRS), Long Term Evolution (LTE) system, Advanced long term evolution (LTE-A) system, New Radio (NR) system, evolution system of NR system, LTE-based access to unlicensed spectrum (LTE-U) system, NR-based access to unlicensed spectrum) unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system or other communication systems.

Generally speaking, traditional communication systems support a limited number of connections and are easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, Vehicle to Everything (V2X) communication, or the like. Embodiments of this application may also be applied to these communication systems.

In some embodiments of this application, the communication system may be applied to a Carrier Aggregation (CA) scenario, a Dual Connectivity (DC) scenario, and a Standalone (SA) networking scenario.

Some embodiments of this application describe various embodiments in conjunction with network device and terminal device, where the terminal device may also be referred to as User Equipment (UE), access terminal, subscriber unit, subscriber station, mobile station, mobile site, remote station, remote terminal, mobile device, user terminal, terminal, wireless communication device, user agent or user device, etc.

In some embodiments of this application, the terminal device may be a STAION (ST) in WLAN, and may be a cellular phone, a cordless phone, a Session Initiation Protocol (SIP) phone, a Wireless Local Loop (WLL) station, a Personal Digital Assistant (PDA) device, a handheld device with wireless communication capabilities, a computing device or other processing devices connected to wireless modems, an in-vehicle device, a wearable device, a terminal device in the next-generation communication system such as NR network, or a terminal device in the future-evolved Public Land Mobile Network (PLMN) network.

In some embodiments of this application, the terminal device can be deployed on land, including indoor or outdoor, handheld, wearable, or vehicle-mounted; it can also be deployed on water (e.g., ships, etc.); it can also be deployed in the air (e.g., airplanes, balloons, and satellites, etc.).

In some embodiments of this application, the terminal device may be a mobile phone, a tablet computer (Pad), a computer with a wireless transceiver function, a Virtual Reality (VR) terminal device, an Augmented Reality (AR)

terminal device, a wireless terminal device in industrial control, a wireless terminal device in self driving, a wireless terminal device in remote medical, a wireless terminal device in smart grid, a wireless terminal device in transportation safety, a wireless terminal device in smart city or a wireless terminal device in smart home, etc.

In some embodiments of this application, the terminal device may also be a wearable device. Wearable devices can also be called wearable smart devices, which are the general term for the intelligent design of daily wear and the development of wearable devices using wearable technology, such as glasses, gloves, watches, clothing and shoes. A wearable device is a portable device that is worn directly on the body or integrated into the user's clothing or accessories. Wearable device is not only a hardware device, but also realizes powerful functions through software support, data interaction, and cloud interaction. In a broad sense, wearable smart devices may be of full-featured, large-scale, complete or partial functions without relying on smart phones, such as smart watches or smart glasses, and also may only focus on a certain type of application function, which needs to cooperate with other devices such as smart phones for usage, such as all kinds of smart bracelets, smart jewelry for physical sign monitoring and the like.

In some embodiments of this application, the network device may be a device for communicating with a mobile device, and the network device may be an Access Point (AP) in WLAN, a Base Transceiver Station (BTS) in GSM or CDMA, a NodeB (NB) in WCDMA, an Evolutional Node B (eNB or eNodeB) in LTE, a relay station, an access point, an in-vehicle device, a wearable device, a gNB in NR network, a network device in the future-evolved PLMN network, or the like.

In some embodiments of this application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, or the like. Optionally, the network device may also be a base station set in a location such as land or water.

In some embodiments of this application, the network device may provide services for a cell, and the terminal device communicates with the network device through transmission resources (e.g., frequency domain resources, or spectrum resources) used by the cell. The cell may correspond to a network device (e.g., a base station). The cell may correspond to a macro base station, or may correspond to a base station of small cell, where the small cell may include metro cell, micro cell, pico cell and femto cell. These small cells have the characteristics of small coverage and low transmit power, and are suitable for providing high-speed data transmission services.

FIG. 1 schematically shows one network device 1100 and two terminal devices 1200. Optionally, the wireless communication system 1000 may include a plurality of network devices 1100, and the coverage of each network device 1100 may include other numbers of terminal devices, which is not limited in the embodiments of this application. Optionally, the wireless communication system 1000 shown in FIG. 1 may also include other network entities such as a Mobility Management Entity (MME), an Access and Mobility Management Function (AMF), and the like, which are not limited in the embodiments of this application.

It should be understood that the terms "system" and "network" are often used interchangeably herein. The term "and/or" herein is used to describe the association relationship of associated objects, for example, it means that there may be three relationships between the associated objects therebefore and thereafter. For example, A and/or B may include following three cases: A exists alone, both A and B exist, and B exists alone. The character "/" in this document generally indicates that the related objects are in "or" relationship. In the description of some embodiments of this application, the term "corresponding" may indicate that there is a direct or indirect corresponding relationship between two objects, or may indicate that there is an associated relationship, a relationship of indicating/being indicated, or a relationship of configuring/being configured between them.

In order to clearly illustrate the concept of some embodiments of this application, the related content of the power control of the terminal device is briefly described first.

Signal Modulation and Terminal Architecture

In wireless communication, modulation is the main method to complete the signal spectrum shift, that is, the input signal and the modulated carrier are nonlinearly operated by the mixer (intermediate device in FIG. 2) to generate the sum/difference frequency signal of the two signals, and the required high-order frequency signal F2 is filtered out therefrom. In this way, the frequency spectrum shift from low frequency to high frequency is completed. Referring to FIG. 3, the frequency relationship is F2=F1+F0, where F1 is an input low-frequency signal, F2 is an output high-frequency signal, and F0 is a modulated carrier.

For frequency bands with relatively low frequencies (e.g., frequency bands below 7.125 GHz), the terminal usually uses up-conversion once to realize spectrum shift, that is, modulates the signal to a relatively high frequency band for transmission, as shown in FIG. 4.

For frequency bands with higher frequencies (e.g., frequency bands above 24 GHz), the terminal usually adopts two up-conversions to realize spectrum shift, that is, first modulates the signal to a relatively high intermediate frequency F01, and then further modulates the signal to a higher frequency band F02 for transmission, as shown in FIG. 5 and FIG. 6.

About Signal Irradiation

Figure 7:
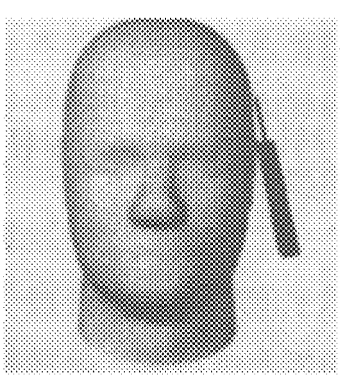
FIG. 7 is a schematic diagram of a state in which a user uses a terminal device.

Terminals need to transmit wireless signals during the communication process, and long-term exposure to wireless signals will cause certain damage to human safety. Therefore, the regulations define the Specific Absorption Ratio (SAR) and the maximum power density to measure the electromagnetic radiation intensity of the terminal to the human body. In order to avoid the impact of electromagnetic radiation equipment such as mobile phones on the human body, the standard has strict requirements on the SAR value and maximum power density of mobile phone radiation, and the terminal cannot exceed the limit. Referring to FIG. 7, in order to avoid the impact on human safety, the terminal usually reduces the transmit power when a human body is detected. The way to detect the human body is currently mainly realized through special sensors. The sensor(s) is usually installed in a specific part of the mobile phone and detects the human body. In addition, for some terminals that do not rely on sensors, in the case that it is impossible to know whether there is a human body approaching, the terminal usually uses a manner in which a power back-off is triggered to reduce the transmit power when it enters a specific state (e.g., working in a certain frequency band), so as to ensure that the radiation to the human body does not exceed the standard. The transmit power of such terminal is relatively conservative, and it is difficult to exert the optimal performance of the terminal.

Before describing some embodiments of this application, the inventive concept of some embodiments of this application is briefly introduced first.

As mentioned above, the terminal needs to control the transmit power. When it detects that it is close to the human body, it needs to reduce the transmit power to avoid the impact on the human body caused by the excessive transmit power. The current sensor-based processing method not only challenges the space requirements of the terminal but also causes pressure on costs. In view of this, one solution is to detect the human body based on the terminal's own ability to transmit and receive signals, and then complete the control of the transmit power. This needs to solve various problems, such as the feasibility of human detection or object detection in a broad sense, acquisition of information such as distance and orientation of objects, and so on.

Figure 8:
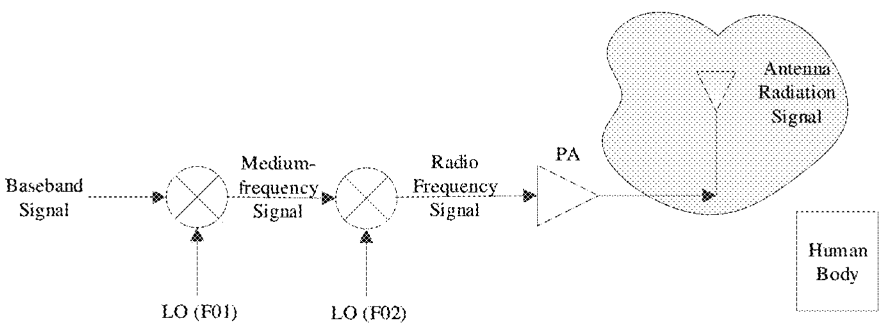
FIG. 8 is a schematic diagram of detecting a human body and transmitting a signal through a low frequency band.

From the characteristics of the signal transmitted by the terminal, the signal radiated to the space by the terminal in the low frequency band through the antenna may have different intensities in various directions, as shown in FIG. 8. When a human body/object approaches, the terminal can detect the difference in the reflected signal, but in this case, it is difficult to know the exact position of the human body or the object and the signal intensity that can be transmitted. Therefore, the error of human/object detection through the low frequency band is relatively large.

Figure 9:
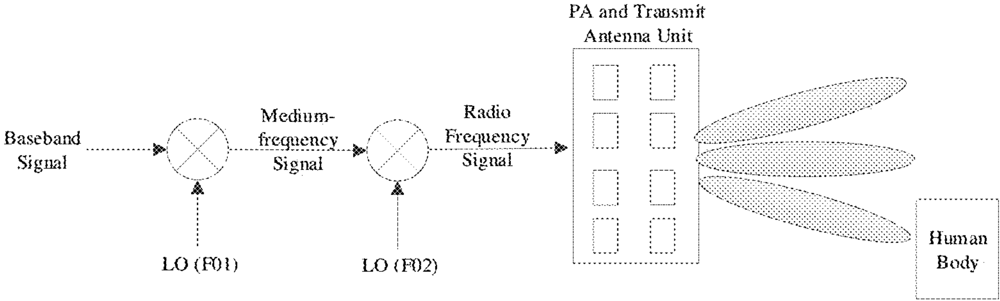
FIG. 9 is a schematic diagram of detecting a human body and transmitting a signal through a high frequency band.

In comparison, in a frequency band with a high frequency (e.g., a frequency band above 24 GHz), the terminal radiates signals into the space in the form of beams, as shown in FIG. 9. Then, by emitting different beams, the position of the human body/object can be determined, and information such as the distance of the human body/object can be obtained by detecting the reflected signal of the beam. It can be seen that it is feasible to detect information such as human bodies through beams in the high frequency band.

In view of this, this application proposes to detect objects such as human bodies through beams in the high frequency band, and control the transmit power accordingly.

Figures 10, 11:
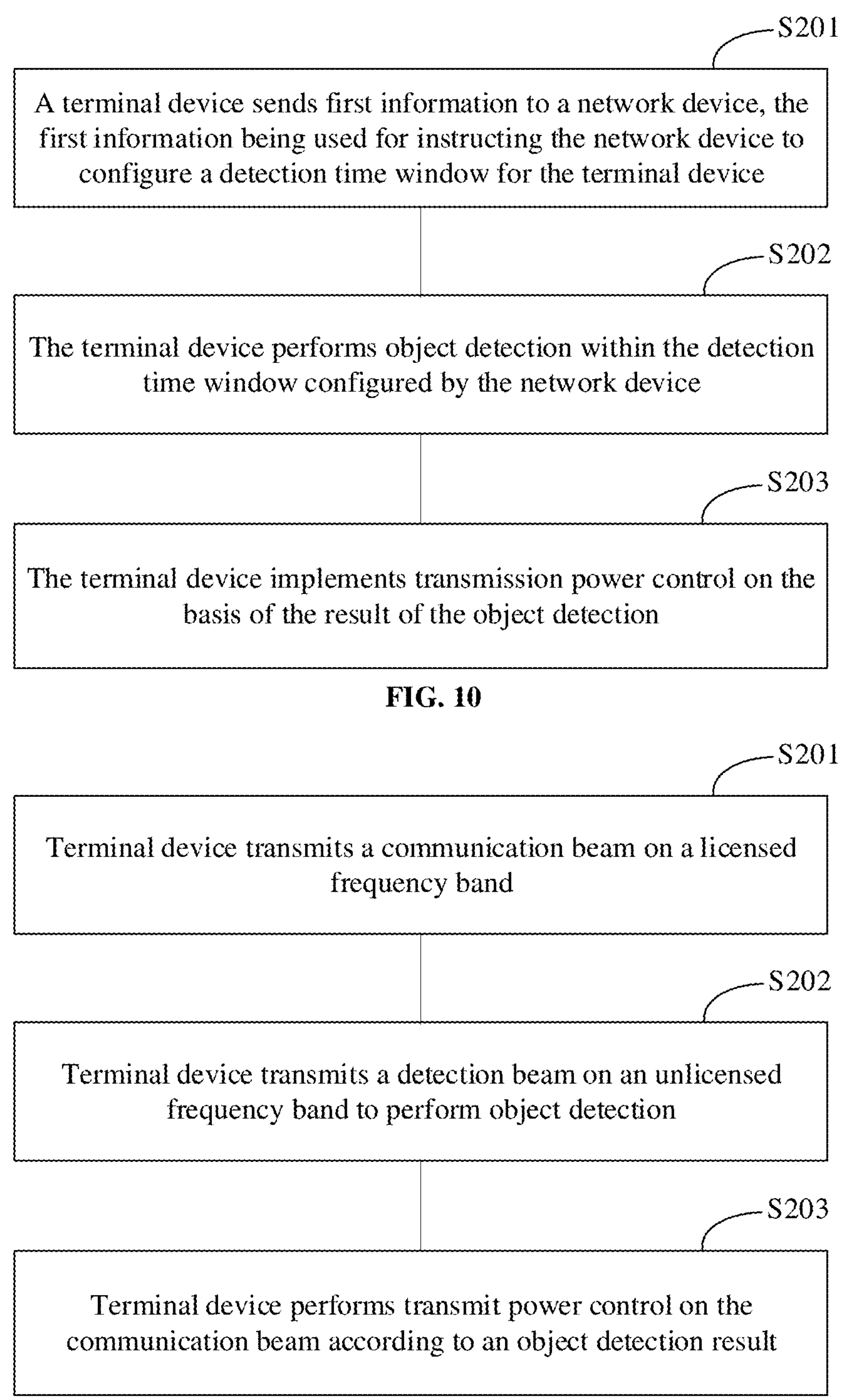
FIG. 10 is a flowchart of a method for controlling transmit power on the terminal side according to some embodiments of this application.
FIG. 11 is a flowchart of a method for controlling transmit power on the terminal side according to some other embodiments of this application.

Specifically, some embodiments of this application provide a transmit power control method, which is applied to a terminal device. Referring to FIG. 10, the method includes following content.

In S101, a terminal device sends first information to a network device, where the first information is used for indicating the network device to configure a detection time window for the terminal device.

In S102, the terminal device performs object detection within the detection time window configured by the network device.

In S103, the terminal device performs transmit power control according to an object detection result.

According to some embodiments of this application, the terminal device can send the indication information for configuring the time window to the network device, and the network device can configure an appropriate time window for the terminal device, so that the terminal device can transmit the sounding beam without affecting the service communication, thereby performing detection of object such as human body, and realizing the power control of the communication beam according to the detection result. Based on some embodiments of this application, the detection of the human body and the control of the terminal transmit power can be realized without increasing the hardware cost and space occupation, which can effectively improve the power control mechanism of the terminal device.

Correspondingly, some embodiments of this application further provide a transmit power control method, which is applied to a network device. Referring to FIG. 11, the method includes following content.

In S201, the network device receives the first information sent by the terminal device.

In S202, the network device configures the detection time window for the terminal device according to the first information.

According to some embodiments of this application, after receiving the indication information, the network device can configure the detection time window for the terminal device, so that the terminal device can transmit the communication beam within the normal communication period and transmit the detection beam within the detection time window, so as to realize the power control of the communication beam according to the detection result. Based on some embodiments of this application, the detection of the human body and the control of the terminal transmit power can be realized without increasing the hardware cost and space occupation, which can effectively improve the power control mechanism of the terminal device and the network device.

Various implementation manners of some embodiments of this application are described below respectively.

The content contained in the first information and the corresponding configuration mode of the network device may optionally be implemented in any of the following manners.

(1) The first information includes detection capability information of the terminal device.

In this case, the network device configures the detection time window according to a predetermined length and period.

(2) The first information includes the length or period of the periodic detection time window required by the terminal device.

In this case, the network device configures the detection time window according to the length or period in the first information and a predetermined period or length.

Optionally, in this case, the first information may further include detection capability information of the terminal device.

(3) The first information includes the length and period of the periodic detection time window required by the terminal device.

In this case, the network device configures the detection time window according to the length and period in the first information.

Optionally, in this case, the first information may further include detection capability information of the terminal device.

(4) The first information includes the length or the start position of the aperiodic detection time window required by the terminal device.

In this case, the network device configures the detection time window according to the length or the start position as well as a predetermined start position or length in the first information.

Optionally, in this case, the first information may further include detection capability information of the terminal device.

(5) The first information includes the length and start position of the aperiodic detection time window required by the terminal device.

In this case, the network device configures the detection time window according to the length and start position in the first information.

Optionally, in this case, the first information may further include detection capability information of the terminal device.

According to some embodiments of this application, optionally, the terminal device performs object detection within the detection time window configured by the network device, which may be implemented in the following manner. The terminal device transmits a detection beam in the detection time window configured by the network device, and receives a reflection signal of the detection beam; then the terminal device determines the object detection result according to the intensity of the detection beam and the intensity of the reflection signal.

According to some embodiments of this application, optionally, if the difference between the intensity of the detection beam and the intensity of the reflected signal is greater than or equal to a first threshold, the terminal device determines that the object detection result is: no object exists in the direction of the detection beam; if the difference between the intensity of the detection beam and the intensity of the reflected signal is less than the first threshold, the terminal device determines that the object detection result is: an object exists in the direction of the detection beam.

According to some embodiments of this application, optionally, the terminal device may transmit multiple detection beams with different directions within multiple periods of the detection time window configured by the network device.

According to some embodiments of this application, optionally, the terminal device performs object detection within the detection time window configured by the network device in any one of the following manners:

- in the process of object detection, the terminal device controls the transmit power of the detection beam to gradually increase from a first power value, and stops transmitting the detection beam after determining that an object exists in the direction of the detection beam;
- in the process of object detection, the terminal device controls the transmit power of the detection beam to gradually increase from the first power value, and stops transmitting the detection beam if no object is detected in the direction of the detection beam but the transmit power of the detection beam has reached the second power value;
- the terminal device determines a third power value according to the transmit power limit information, transmits the detection beam with the third power value, and stops transmitting the detection beam after determining that an object exists in the direction of the detection beam.

According to some embodiments of this application, optionally, the terminal device transmits a communication beam outside the detection time window configured by the network device, and the terminal device performs transmit power control according to the object detection result in any one of the following manners:

- if an object exists in the direction of the detection beam, the terminal device adjusts the transmit power of the communication beam in the direction of the detection beam to meet radiation requirements. In one case, the terminal device controls the power of the communication beam only in the direction in which the object is detected, and transmits the communication beam at normal power in the direction in which no object exists; that is, different control strategies can be adopted for the communication beams in the direction in which the object is detected and in the direction in which no object is detected;
- if an object exists in the direction of the detection beam, the terminal device adjusts the transmit power of multiple communication beams to meet radiation requirements, where the multiple communication beams include the communication beam in the direction of the detection beam. For example, the multiple communication beams may include all communication beams, that is, the terminal device may adopt the same control strategy for all communication beams.

According to some embodiments of this application, optionally, before the terminal device performs object detection within the detection time window configured by the network device, the terminal device switches the transceiving path from a first frequency band to a second frequency band; and after object detection, the terminal device switches the transceiving path from the second frequency band back to the first frequency band. In some embodiments, the first frequency band includes a licensed frequency band or an unlicensed frequency band, and the second frequency band includes a licensed frequency band or an unlicensed frequency band.

The above embodiments of this application mainly discuss the implementation of human/object detection based on the licensed frequency band. Due to the relevant limitations of the licensed frequency band, the transmission time and transmit power of the terminal device need to be configured by the network device before transmission. Different from this, this application may also consider the transmission and reception of detection beams based on the unlicensed frequency band. Since there is no need for network device to allocate detection time window, the processing manner can be relatively flexible. In other words, on the unlicensed frequency band, power control can be achieved by the terminal device through power transmission and reception.

Figure 12:
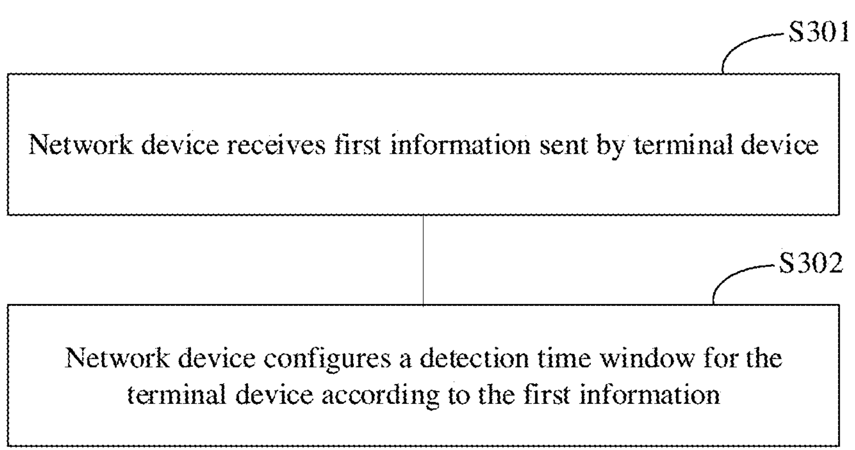
FIG. 12 is a flowchart of a method for controlling transmit power on the network side according to some embodiments of this application.

In view of above, some embodiments of this application further provide a transmit power control method, which is applied to a terminal device. Referring to FIG. 12, the method includes following content.

In S301, the terminal device transmits a communication beam on the licensed frequency band.

In S302, the terminal device transmits a detection beam on the unlicensed frequency band for object detection.

In S303, the terminal device performs transmit power control on the communication beam according to the object detection result.

According to some embodiments of this application, the terminal device transmits the communication beam on the licensed frequency band, transmits the detection beam on the unlicensed frequency band to detect objects such as human body, and controls the transmit power of the communication beam according to the detection result of the detection beam. In some embodiments, the transmission and reception process of the detection beam has a greater degree of freedom, because the detection beam does not occupy the resources of the communication beam, and does not need a dedicated detection window to be configured by the network side, and does not affect the communication beam. The logic complexity of the processing process is low and the flexibility is high, which can effectively improve the power control mechanism of the terminal device.

In some embodiments of this application, optionally, the terminal device transmits the detection beam on the unlicensed frequency band to perform object detection, which may be realized in the following manner. The terminal device transmits the detection beam on the unlicensed frequency band, and receives reflected signal of the detection beam on the unlicensed frequency band; the terminal device determines the object detection result according to the intensity of the detection beam and the intensity of the reflected signal.

In some embodiments of this application, optionally, if the difference between the intensity of the detection beam and the intensity of the reflected signal is greater than or equal to a first threshold, the terminal device determines that the object detection result is: no object exists in the direction of the detection beam; if the difference between the intensity of the detection beam and the intensity of the reflected signal is less than the first threshold, the terminal device determines that the object detection result is: an object exists in the direction of the detection beam.

In some embodiments of this application, optionally, the terminal device transmits multiple detection beams with different directions on the unlicensed frequency band.

In some embodiments of this application, optionally, the terminal device transmits the detection beam on the unlicensed frequency band to perform object detection in any one of the following manners:

in the process of object detection, the terminal device controls the transmit power of the detection beam to gradually increase from a first power value, and stops transmitting the detection beam after determining that an object exists in the direction of the detection beam;

in the process of object detection, the terminal device controls the transmit power of the detection beam to gradually increase from the first power value, and stops transmitting the detection beam if no object is detected in the direction of the detection beam but the transmit power of the detection beam has reached the second power value;

the terminal device determines a third power value according to the transmit power limit information, transmits the detection beam with the third power value, and stops transmitting the detection beam after determining that an object exists in the direction of the detection beam.

In some embodiments of this application, optionally, the terminal device performs transmit power control on the communication beam according to the object detection result in any one of the following manners:

if an object exists in the direction of the detection beam, the terminal device adjusts the transmit power of the communication beam in the direction of the detection beam to meet radiation requirements. In one case, the terminal device controls the power of the communication beam only in the direction in which the object is detected, and transmits the communication beam at normal power in the direction in which no object exists; that is, different control strategies can be adopted for the communication beams in the direction in which the object is detected and in the direction in which no object is detected;

if an object exists in the direction of the detection beam, the terminal device adjusts the transmit power of multiple communication beams to meet radiation requirements, where the multiple communication beams include the communication beam in the direction of the detection beam. For example, the multiple communication beams may include all communication beams, that is, the terminal device may adopt the same control strategy for all communication beams.

According to at least one of the above embodiments of this application, human body/object detection is performed based on high-frequency beam transmission and reception, it is possible to make full use of the existing hardware path around the terminal to detect human body/object, and further adjust the transmit power based on thereon, so as to achieve the purpose of optimizing the transmit power of the terminal and improve the safety of use.

The implementation manner of the transmit power control method of some embodiments of this application is described above through some embodiments, and various aspects of the specific implementation process of some embodiments of this application are described below based on a plurality of specific examples.

Figure 13:
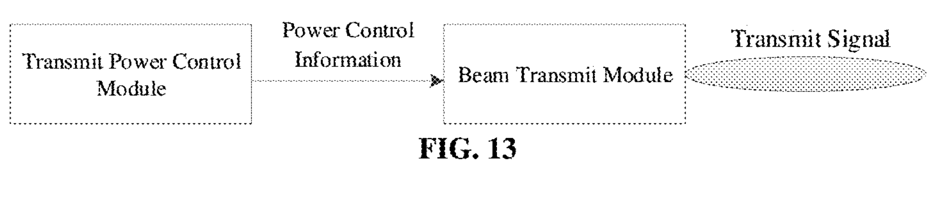
FIG. 13 is a schematic diagram of a transmission structure of a terminal device.
Figure 14:
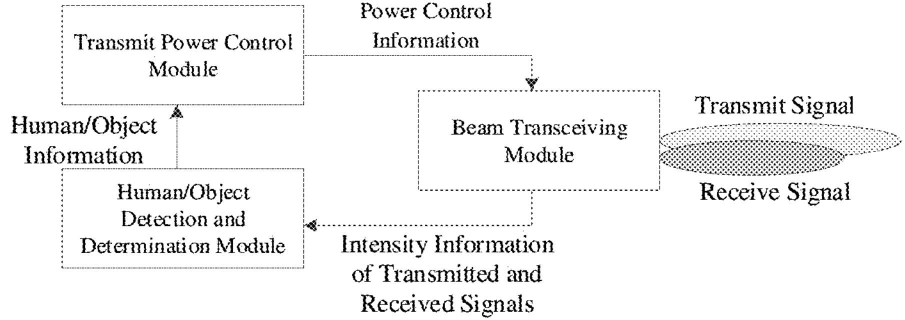
FIG. 14 is a schematic diagram of human/object detection based on transceiving beams according to some embodiments of this application.
Figure 15:
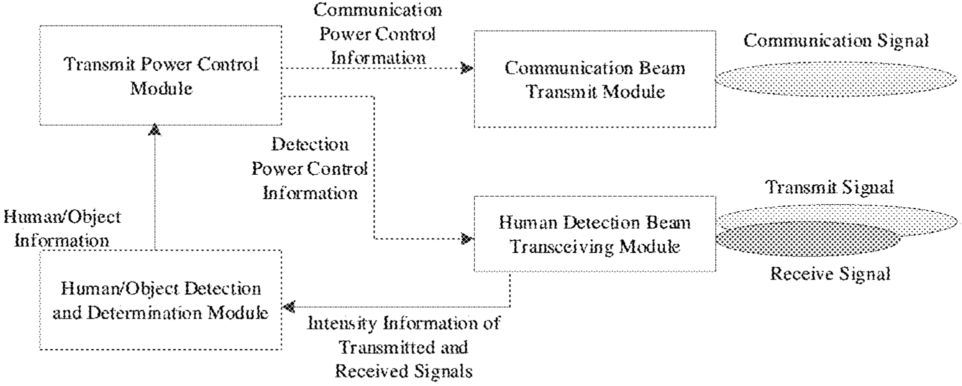
FIG. 15 is another schematic diagram of human/object detection based on transceiving beams according to some embodiments of this application.

FIG. 13 schematically shows a schematic diagram of an internal transmission structure of a terminal device, in which the transmission of signal beams is completed by a transmit power control module and a beam transmission module. FIG. 14 and FIG. 15 schematically show two kinds of human/object detection logic diagrams based on the transceiving beams of the terminal device.

Referring to FIG. 14, the transmit power control module controls beam transmission, the terminal receives and detects the reflected signal, inputs intensity information of the transmitted and received signals into the human body/object detection and judgment module, and then inputs the human body/object judgment information into the transmit power control module, so as to adjust the transmit power of the communication signal. Herein, the beam transceiving module may be implemented by reusing an existing high-frequency communication module.

Referring to FIG. 15, the transmit power control module controls the transmission of the communication beam and the human body/object detection beam, the terminal receives and detects the reflected signal, inputs intensity information of the transmitted and received signals into the human body/object detection and judgment module, and then inputs the human body/object judgment information into the transmit power control module, so as to adjust the communication transmit power. Herein, the human body detection beam transceiving module and the communication beam transmission module may be independent of each other.

Based on above, the terminal device can implement the transmit power control method according to some embodiments of this application, and the specific contents involved in the implementation process of the solution are described in detail below.

I. About Transmission Time

As mentioned above, the terminal can detect the human body/object on the high frequency band, so the terminal needs to transmit signals into space. Usually, in order to avoid interference to other users, the signal transmission of the terminal on the licensed frequency band (the licensed frequency band refers to the frequency spectrum that can be used only by the authorization of the regulator, for example, the mobile communication network operated by the operator and the like are all licensed frequency bands) is strictly controlled by the network, and needs to be performed in the time slot that the network schedules or configures the terminal for transmission. Therefore, if the terminal wants to use the transmitted beam signal to detect the human body/object, the network needs to configure the corresponding transmission time slot(s) to meet certain transmit power constraints.

Figure 16:
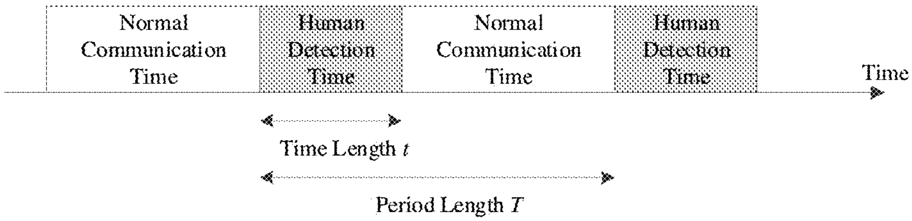
FIG. 16 is a schematic diagram of a human body detection time window according to some embodiments of this application.
Figure 17:
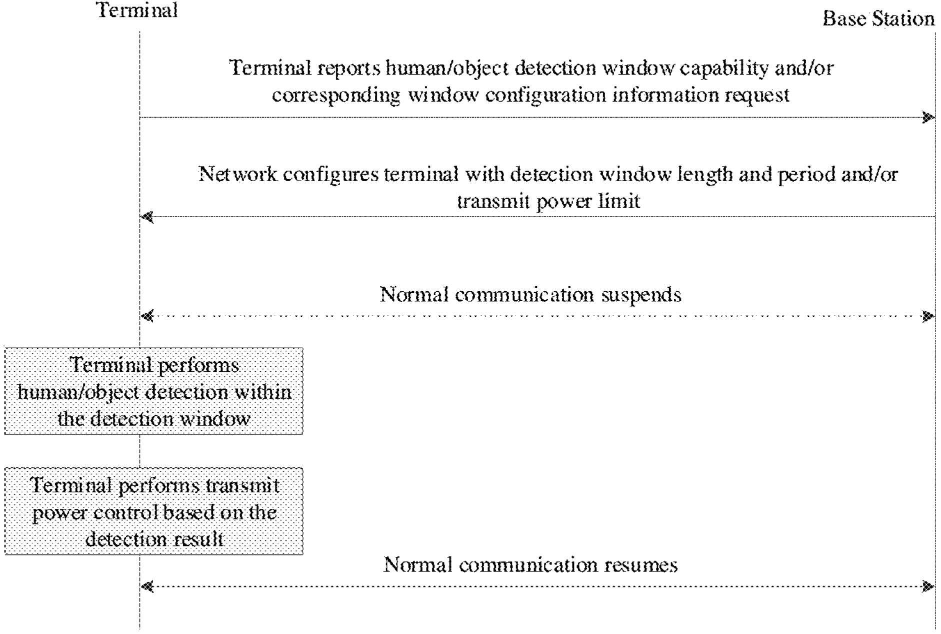
FIG. 17 is a schematic diagram of an interaction process of human body detection according to some embodiments of this application.

Referring to FIG. 16 and FIG. 17, the network needs to configure a certain human detection time in normal communication, where the time length is t, and the period is T.

Usually, the human body detection transmit power allowed by the terminal may be relatively small, which limits the detection accuracy. Therefore, the terminal needs to make joint judgments by accumulating multiple detection results, so as to determine information such as the existence and distance of the human body/object.

In order to notify the network that the terminal has the capability of human detection and/or the terminal needs to perform human detection, the terminal may report the capability information and/or the required detection time window information (e.g., the length and/or period of the window) to the network through RRC signaling. Herein, the capability information may include, for example, any of the following information, or other suitable forms:

human/object detection capability window (or referred to as proximity detection gap);

power management window capability (or referred to as power management gap).

After receiving the human body detection capability information and/or the detection time window information of the terminal, the network configures the terminal with a corresponding detection time window through an RRC message. In some embodiments, if the network has received the human body detection capability information of the terminal, but has not received the detection time window information (or, the network has received the length information of the detection time window without the period information), the network may perform the configuration according to a predefined window length and/or a predefined period. Within this window, the terminal and the base station do not transmit communication information. It should be noted that, for the resources within the detection time window, the base station may choose to configure it for use by other terminals, and certainly may choose not to provide it for use by other terminals.

II. About Beam Scanning

Figure 18:
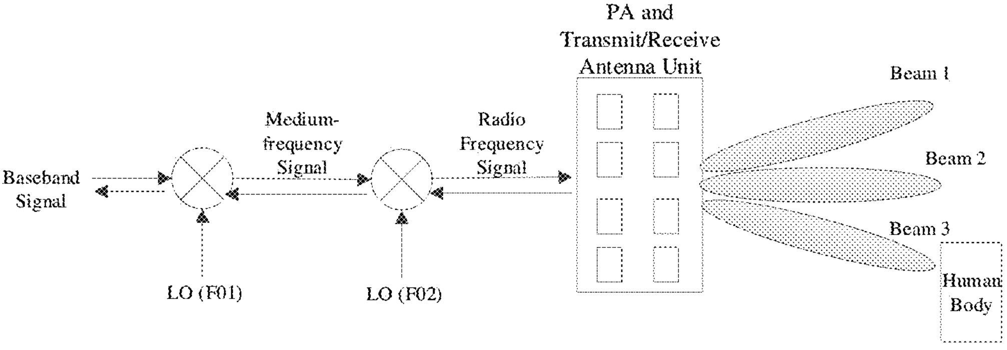
FIG. 18 is a schematic diagram of scanning a human body detection beam according to some embodiments of this application.

As shown in FIG. 18, within the human body detection time window configured by the network, the terminal scans beam 1, beam 2, and beam 3 in sequence, that is, transmits and receives signals beam by beam, and obtains the human body/object information by comparing the intensity of the signals. Optionally, the terminal may complete scanning of multiple or all beams within one detection time window. Optionally, when scanning of all beams cannot be completed in one window, scanning and detection of beams may be continued in the next detection time window.

III. About Power Control

The detection of human body/object is performed by comparing the difference between the intensity of the transmitted signal and the received reflected signal. For example, if the transmitted signal is P0 and the received reflected signal is P1, then the reflection loss of the human body/object is P0-P1. The smaller the value of the reflection loss, the closer the human/object is to the terminal. In some embodiments of this application, it can be judged and controlled as follows:

when the difference is higher than a certain threshold, it may be considered that no human body/object exists, or the human body/object is at a relatively long distance and has relatively small impact on human safety, so the communication beam of the terminal can be transmitted according to normal power requirements;

when the difference is lower than the certain threshold, it may be considered that a human body/object exists, and is at a relatively short distance and, thus, has a relatively great impact on human safety, so it is necessary to adjust the communication beam transmit power of the terminal to meet the radiation requirements.

In some embodiments of this application, the control of the transmit power of the communication beams may be that the same power control strategy is adopted for all beams. For example, when the transmit power needs to be limited, multiple or all beams may be limited within the target transmit power. Alternatively, different power control strategies can also be used for different beams. For example, the power of "Beam 3" in FIG. 18 is limited, while "Beam 1" and "Beam 2" can be transmitted according to normal power requirements.

On the other hand, since signal radiation of the terminal into space is strictly limited on the licensed frequency band, so as to avoid interference to other users. In view of this, in some embodiments of this application, the terminal may use a lower power when performing initial detection beam transmission, then gradually increase the power, and suspend the power transmission when a human body/object is detected, so as to reduce the interference problem as much as possible. In the case that the terminal already knows the limit on the detection power and the gain of the detection beam, the terminal can also directly use the corresponding maximum power to perform detection.

IV. About the Working Frequency Band

The above describes the human/object detection based on the licensed frequency band. For the licensed frequency band, the terminal is subject to many restrictions, including the transmission time and transmit power, which need to be configured through the network.

Some embodiments of this application further provide a more flexible processing manner, in which detection beams are transmitted and received based on the un-licensed frequency band. According to the method of some embodiments of this application, the terminal may have more degrees of freedom to transmit and receive power on the un-licensed frequency band.

Figure 19:
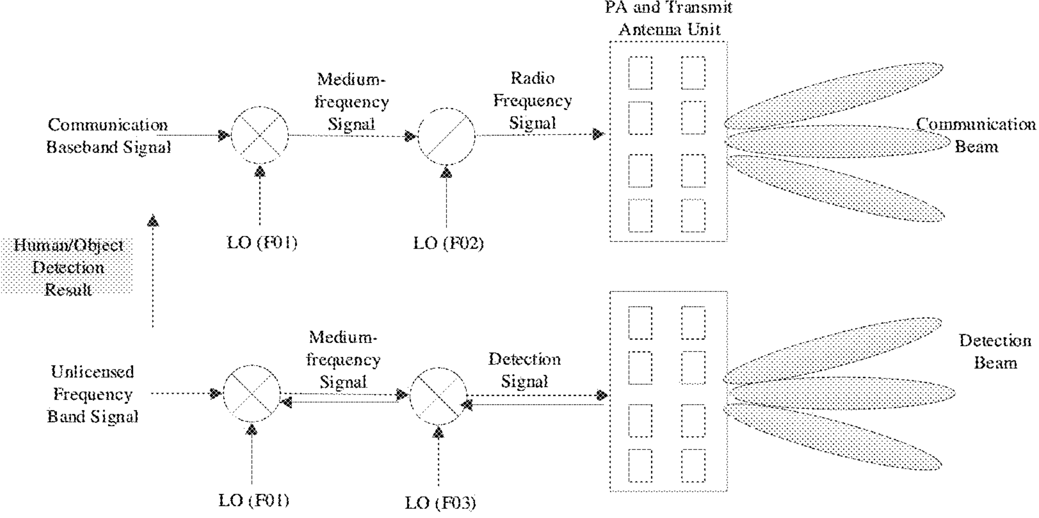
FIG. 19 is a schematic diagram of a terminal architecture having a human body detection transceiver channel with an independent license-free frequency band according to some embodiments of this application.

Referring to FIG. 19, for a terminal with independent un-licensed transceiving paths, human detection and normal communication services operating on the un-licensed frequency band can be performed at the same time, and there is no need for the network to allocate a human/object detection time window. The detection beam of the terminal does not affect the communication beam. The result of human body detection is fed back to the communication path so that the terminal can adjust the transmit power. It should be noted that the above processing method requires an independent un-licensed detection path without requiring network configuration, and the implementation process is flexible and convenient.

Compared with the forgoing terminal that needs to have independent un-licensed frequency band human body detection beam transceiving path, some embodiments of this application further provide an implementation solution. Different from the transceiving paths shown in FIG. 19, the terminal in this solution has a limited number of transceiving path(s) used for normal communication, when the terminal needs to switch the working frequency band, the transceiver channel can be switched to the target frequency band.

Figure 20:
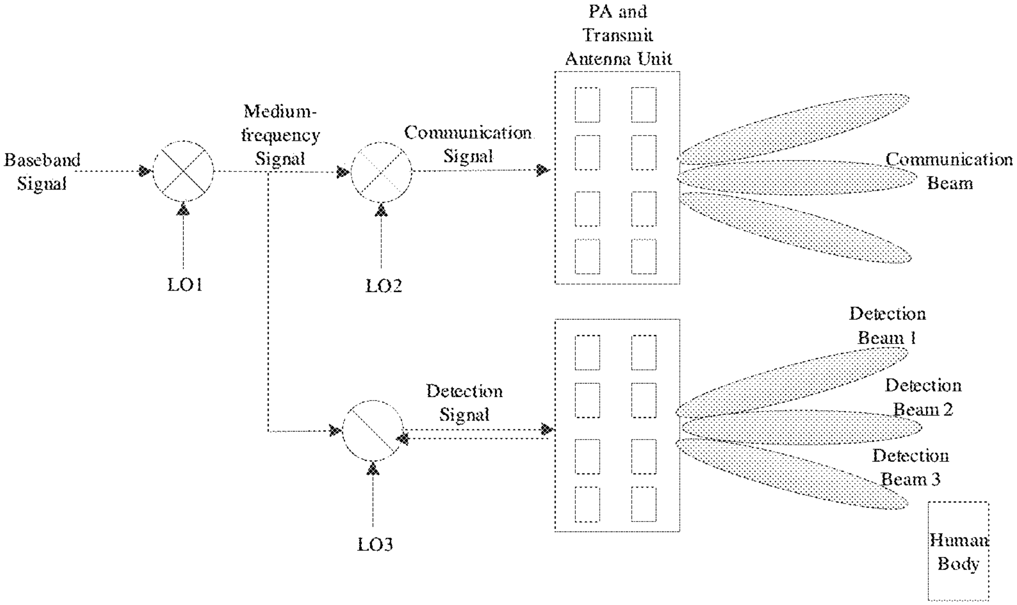
FIG. 20 is a schematic diagram of a terminal having a common-IF LO1 architecture according to some embodiments of this application.

FIG. 20 shows a schematic diagram of a terminal architecture that shares an intermediate frequency link LO1. In this architecture, the intermediate frequency link of the terminal does not support simultaneous transmission of high-frequency communication signals and detection signals. Therefore, it is necessary to configure certain time windows to switch the intermediate frequency signal LO1 to the detection signal frequency band, thereby being used for the transmission and reception of the detection beam. Accordingly, the terminal needs to request the network device to configure this switching time window for the terminal device for frequency band switching. Based on the steps and content of configuring the detection time window for the terminal device by the network device described above, the detection time window can be multiplexed as the switching time window. In other words, referring to FIG. 17, before the terminal starts to detect objects within the detection time window, the terminal needs to switch the transceiving path from the current frequency band (e.g., a first frequency band) to the target frequency band (e.g., a second frequency band), and switch from the second frequency band back to the first frequency band after the detection is completed. The first frequency band may be a licensed frequency band or an unlicensed frequency band, and the second frequency band may also be a licensed frequency band or an unlicensed frequency band, both of which can achieve the solutions and purposes described in some embodiments of this application.

Using at least one of the above embodiments of this application to detect the human body/object can make full use of the existing hardware paths of the terminal to realize the detection of the human body/object, and adjust the transmit power based thereon, so as to achieve the purpose of optimizing the transmit power of the terminal, thereby improving the use security of terminal device.

Figure 21:
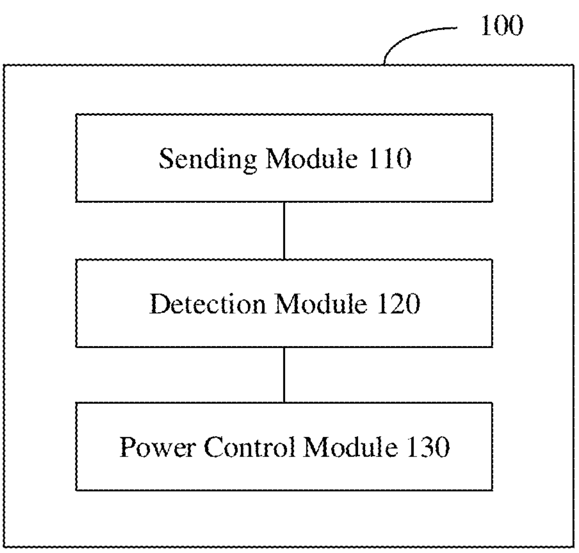
FIG. 21 is a schematic structural block diagram of a terminal device according to some embodiments of this application.

The specific settings and implementations of some embodiments of this application have been described above through multiple embodiments from different perspectives. Corresponding to the processing method of at least one embodiment above, some embodiments of this application further provide a terminal device 100, referring to FIG. 21, which includes following content.

A sending module 110 is configured to send first information to a network device, wherein the first information is used for indicating the network device to configure a detection time window for the terminal device.

A detection module 120 is configured to perform object detection within the detection time window configured by the network device.

A power control module 130 is configured to perform transmit power control according to an object detection result.

Figure 22:
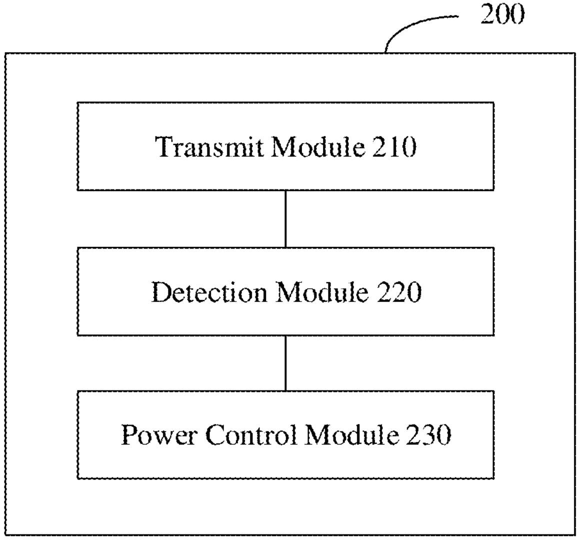
FIG. 22 is a schematic structural block diagram of a terminal device according to some other embodiments of this application.

Corresponding to the processing method of at least one embodiment above, some embodiments of this application further provide a terminal device 200, referring to FIG. 22, which includes following content.

A transmitting module 210 is configured to transmit a communication beam on a licensed frequency band.

A detection module 220 is configured to transmit a detection beam on an unlicensed frequency band for object detection.

A power control module 230 is configured to perform transmit power control on the communication beam according to an object detection result.

Figure 23:
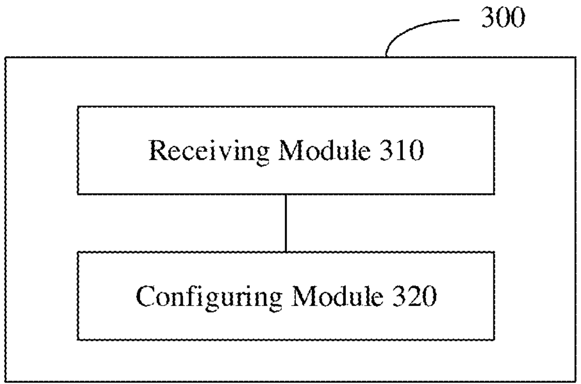
FIG. 23 is a schematic structural block diagram of a network device according to some embodiments of this application.

Corresponding to the processing method of at least one embodiment above, some embodiments of this application further provide a network device 300, referring to FIG. 23, which includes following content.

A receiving module 310 is configured to receive first information sent by a terminal device.

A configuration module 320 is configured to configure a detection time window for the terminal device according to the first information.

The terminal devices 100 and 200 and the network device 300 in some embodiments of this application can implement the corresponding functions of the devices in the foregoing method embodiments, and processes, functions, implementations, and beneficial effects corresponding to each module (submodule, unit or component, etc.) in the terminal devices 100 and 200 and the network device 300 can be found in the corresponding descriptions in the above method embodiments, which will not be repeated here.

It should be noted that the functions described by the respective modules (submodules, units, or components, etc.) in the terminal devices 100 and 200 and the network device 300 in some embodiments of this application may be achieved by different modules (submodules, units, or components, etc.), and may also be achieved by the same module (sub-module, unit or component, etc.). For example, the first sending module and the second sending module can be different modules or the same module, both of which can realize the corresponding functions in some embodiments of this application. In addition, the sending module and the receiving module in some embodiments of this application may be implemented by the transceiver of the device, and some or all of the other modules may be implemented by the processor of the device.

Figure 24:
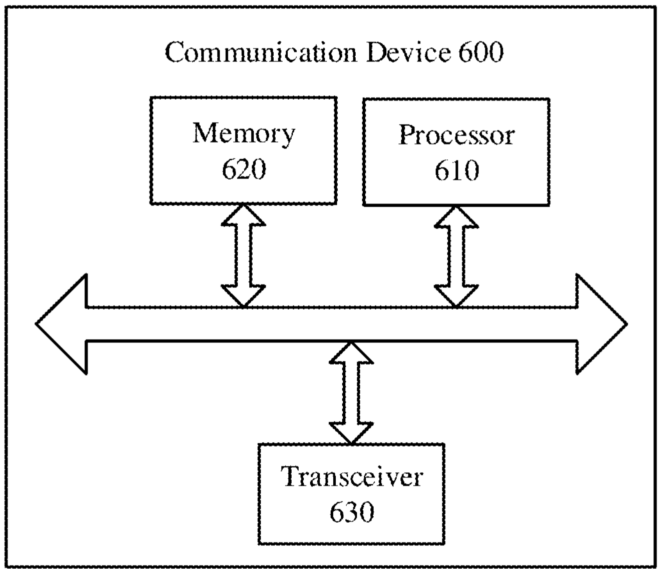
FIG. 24 is a schematic block diagram of a communication device according to some embodiments of this application.

FIG. 24 is a schematic structural diagram of a communication device 600 according to some embodiments of this application, where the communication device 600 includes a processor 610, and the processor 610 can call and run a computer program from a memory to implement the method according to some embodiments of this application.

Optionally, the communication device 600 may also include a memory 620. The processor 610 may call and run a computer program from the memory 620 to implement the method according to some embodiments of this application.

The memory 620 may be a separate device independent of the processor 610, or may be integrated in the processor 610.

Optionally, the communication device 600 may further include a transceiver 630, and the processor 610 may control the transceiver 630 to communicate with other devices. Specifically, it may send information or data to other devices, or receive information or data sent by other devices.

In some embodiments, the transceiver 630 may include a transmitter and a receiver. The transceiver 630 may further include antennas, and the number of the antennas may be one or more.

Optionally, the communication device 600 may be the network device according to some embodiments of this application, and the communication device 600 may implement the corresponding processes implemented by the network device in each method according to some embodiments of this application, which is not repeated here for brevity.

Optionally, the communication device 600 may be the terminal device according to some embodiments of this application, and the communication device 600 may implement corresponding processes implemented by the terminal device in each method according to some embodiments of this application, which is not repeated here for brevity.

Figure 25:
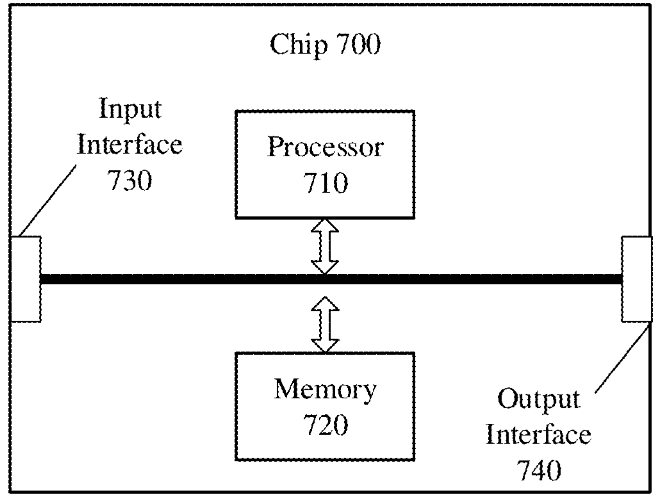
FIG. 25 is a schematic block diagram of a chip according to some embodiments of this application.

FIG. 25 is a schematic structural diagram of a chip 700 according to some embodiments of this application, where the chip 700 includes a processor 710, and the processor 710 can call and run a computer program from a memory to implement the method according to some embodiments of this application. The processor 710 may include at least one processor circuit.

Optionally, the chip 700 may further include a memory 720. The processor 710 may call and run a computer program from the memory 720 to implement the method according to some embodiments of this application.

The memory 720 may be a separate device independent of the processor 710, or may be integrated in the processor 710.

Optionally, the chip 700 may further include an input interface 730. The processor 710 may control the input interface 730 to communicate with other devices or chips, and specifically, may acquire information or data sent by other devices or chips.

Optionally, the chip 700 may further include an output interface 740. The processor 710 may control the output interface 740 to communicate with other devices or chips, and specifically, may output information or data to other devices or chips.

Optionally, the chip can be applied to the network device according to some embodiments of this application, and the chip can implement the corresponding processes implemented by the network device in each method according to some embodiments of this application, which is not repeated here for brevity.

Optionally, the chip can be applied to the terminal device according to some embodiments of this application, and the chip can implement the corresponding processes implemented by the terminal device in each method according to some embodiments of this application, which is not repeated here for brevity.

It should be understood that the chip mentioned in some embodiments of this application may also be referred to as a system-level chip, a system chip, a chip system, a system-on-chip, or the like.

The processor mentioned above may be a general-purpose processor, a digital signal processor (DSP), a field programmable gate array (FPGA), an application specific integrated circuit (ASIC) or other programmable logic devices, transistor logic devices, discrete hardware components, or the like. The general-purpose processor mentioned above may be a microprocessor or any conventional processor or the like.

The memory mentioned above may be either volatile memory or non-volatile memory, or may include both volatile and non-volatile memories. The non-volatile memory may be read-only memory (ROM), programmable read-only memory (PROM), erasable programmable read-only memory (EPROM), electrically EPROM (EEPROM) or flash memory. Volatile memory may be random access memory (RAM).

It should be understood that the above memory is an example but not a limitative description, for example, the memory in some embodiments of this application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM) and so on. In other words, the memory in some embodiments of this application is intended to include but not limited to these and any other suitable types of memory.

Figure 26:
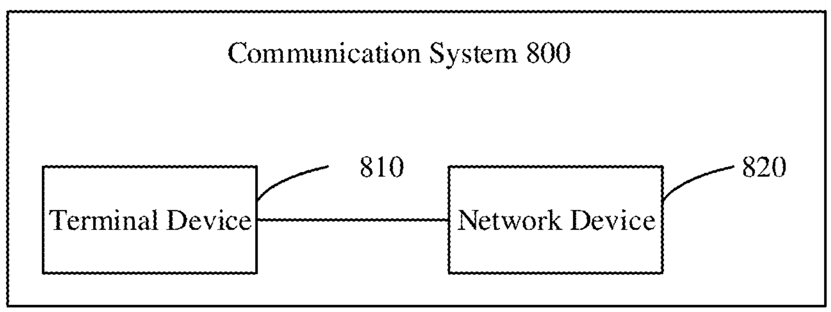
FIG. 26 is a schematic block diagram of a communication system according to some embodiments of this application.

FIG. 26 is a schematic block diagram of a communication system 800 according to some embodiments of this application, where the communication system 800 includes a terminal device 810 and a network device 820.

The terminal device 810 may be configured to implement the corresponding functions implemented by the terminal device in the methods according to the various embodiments of this application, and the network device 820 may be configured to implement the corresponding functions implemented by the network device in the methods according to the various embodiments of this application. For brevity, details are not repeated here.

In the above-mentioned embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, all or part of the processes or functions described in some embodiments of this application are generated. The computer may be a general purpose computer, a special purpose computer, a computer network, or other programmable device. The computer instructions may be stored on or transmitted from one computer readable storage medium to another computer readable storage medium, for example, the computer instructions may be transmitted over a wire from a website site, computer, server or data center to another website site, computer, server or data center in wired manner (e.g., coaxial cable, optical fiber, digital subscriber line (DSL)) or wireless manner (e.g., infrared, wireless, microwave, etc.). The computer-readable storage medium can be any available medium that can be accessed by a computer or a data storage device such as a server, data center, and the like that includes one or more available medium integrated. The available medium may be magnetic medium (e.g., floppy disks, hard disks, magnetic tapes), optical medium (e.g., DVD), or semiconductor medium (e.g., solid state disk (SSD)).

It should be understood that, in various embodiments of this application, the size of the sequence numbers of the above-mentioned processes does not mean the execution sequence, and the execution sequence of each process should be determined by its functions and internal logic, and should not constitute any limitation on embodiments of this application.

Those skilled in the art can clearly understand that, for the convenience and brevity of description, the specific working process of the above-described systems, devices and units can refer to the corresponding processes in the foregoing method embodiments, which will not be repeated here.

The above are only specific embodiments of this application, but the protection scope of this application is not limited thereto. Any person skilled in the art who is familiar with the technical scope disclosed in this application can easily think of changes or substitutions, which should fall within the protection scope of this application. Therefore, the protection scope of this application shall be subject to the protection scope of the claims.

What is claimed is:

1. A transmit power control method, being applied to a terminal device and comprising:

sending, by the terminal device, first information to a network device, wherein the first information is used for indicating the network device to configure a detection time window for the terminal device;

performing, by the terminal device, object detection within the detection time window configured by the network device; and performing, by the terminal device, transmit power control according to an object detection result, wherein performing, by the terminal device, the object detection within the detection time window configured by the network device comprises:

transmitting, by the terminal device, a detection beam within the detection time window configured by the network device, and receiving a reflected signal of the detection beam; and determining, by the terminal device, the object detection result according to an intensity of the detection beam and an intensity of the reflected signal.

2. The method according to claim 1, wherein, the first information comprises detection capability information of the terminal device.

3. The method according to claim 1, wherein, the first information comprises a length or a period of a periodic detection time window required by the terminal device;

or, the first information comprises the length and the period of the periodic detection time window required by the terminal device.

4. The method according to claim 3, wherein, the first information further comprises detection capability information of the terminal device.

5. The method according to claim 1, wherein, the first information comprises a length or a start position of an aperiodic detection time window required by the terminal device;

or, the first information comprises the length and the start position of the aperiodic detection time window required by the terminal device.

6. The method according to claim 1, wherein, if a difference between the intensity of the detection beam and the intensity of the reflected signal is greater than or equal to a first threshold, the object detection result determined by the terminal device is that no object exists in a direction of the detection beam; and if the difference between the intensity of the detection beam and the intensity of the reflected signal is less than the first threshold, the object detection result determined by the terminal device is that an object exists in the direction of the detection beam.

7. The method according to claim 1, wherein transmitting, by the terminal device, the detection beam within the detection time window configured by the network device comprises:

transmitting, by the terminal device, multiple detection beams with different directions within multiple periods of the detection time window configured by the network device.

8. The method according to claim 1, wherein performing, by the terminal device, the object detection within the detection time window configured by the network device further comprises:

controlling, by the terminal device during the object detection, a transmit power of the detection beam to gradually increase from a first power value, and stopping transmission of the detection beam after determining that an object exists in a direction of the detection beam;

or, controlling, by the terminal device during the object detection, the transmit power of the detection beam to gradually increase from the first power value, and stopping transmission of the detection beam after the transmit power of the detection beam has reached a second power value but no object is detected in the direction of the detection beam;

or, determining, by the terminal device, a third power value according to transmit power limit information, transmitting the detection beam with the third power value, and stopping transmission of the detection beam after determining that an object exists in the direction of the detection beam.

9. The method according to claim 1, further comprising: transmitting, by the terminal device, a communication beam outside the detection time window configured by the network device; wherein, performing, by the terminal device, the transmit power control according to the object detection result comprises:

if an object exists in a direction of the detection beam, adjusting, by the terminal device, a transmit power of the communication beam in the direction of the detection beam to meet a radiation requirement;

or, if an object exists in the direction of the detection beam, adjusting, by the terminal device, a transmit power of multiple communication beams to meet the radiation requirement, wherein the multiple communication beams comprise the communication beam in the direction of the detection beam.

10. The method according to claim 1, wherein, prior to performing, by the terminal device, the object detection within the detection time window configured by the network device, the method further comprises:

switching, by the terminal device, a transceiving path from a first frequency band to a second frequency band; and, after the object detection, the terminal device switches the transceiving path from the second frequency band back to the first frequency band; wherein, the first frequency band comprises a licensed frequency band or an unlicensed frequency band, and the second frequency band comprises a licensed frequency band or an unlicensed frequency band.

11. A terminal device, comprising: a processor and a memory, wherein the memory is configured to store a computer program, and the processor, through invoking and executing the computer program stored in the memory, is configured to:

send first information to a network device, wherein the first information is used for indicating the network device to configure a detection time window for the terminal device;

perform object detection within the detection time window configured by the network device; and perform transmit power control according to an object detection result, wherein the processor is specifically configured to:

transmit a detection beam within the detection time window configured by the network device, and receive a reflected signal of the detection beam; and determine the object detection result according to an intensity of the detection beam and an intensity of the reflected signal.

12. The terminal device according to claim 11, wherein, the first information comprises detection capability information of the terminal device.

13. The terminal device according to claim 11, wherein, the first information comprises a length or a period of a periodic detection time window required by the terminal device;

or, the first information comprises the length and the period of the periodic detection time window required by the terminal device.

14. The terminal device according to claim 11, wherein, the first information comprises a length or a start position of an aperiodic detection time window required by the terminal device;

or, the first information comprises the length and the start position of the aperiodic detection time window required by the terminal device.

15. A network device, comprising: a processor and a memory, wherein the memory is configured to store a computer program, and the processor, through invoking and executing the computer program stored in the memory, is configured to:

receive first information sent by a terminal device; and configure a detection time window for the terminal device according to the first information, causing the terminal device to transmit a detection beam within the detection time window, receive a reflected signal of the detection beam, and determine an object detection result according to an intensity of the detection beam and an intensity of the reflected signal.

16. The network device according to claim 15, wherein, the first information comprises detection capability information of the terminal device, and the network device configures the detection time window according to a predetermined length and a predetermined period.

17. The network device according to claim 15, wherein, the first information comprises a length or a period of a periodic detection time window required by the terminal device, and the network device configures the detection time window according to the length or the period in the first information as well as a predetermined period or a predetermined length;

or, the first information comprises the length and the period of the periodic detection time window required by the terminal device, and the network device configures the detection time window according to the length and the period in the first information.

18. The network device according to claim 17, wherein, the first information further comprises detection capability information of the terminal device.

19. The network device according to claim 15, wherein, the first information comprises a length or a start position of an aperiodic detection time window required by the terminal device, and the network device configures the detection time window according to the length or the start position in the first information as well as a predetermined start position or a predetermined length;

or, the first information comprises the length and the start position of the aperiodic detection time window required by the terminal device, and the network device configures the detection time window according to the length and the start position in the first information.

* * * * *